United States Patent [19]

Hodge et al.

[11] 4,300,461

[45] Nov. 17, 1981

[54] GRASS SEED PLANTER HAVING FLUID INJECTION SOIL OPENER

[76] Inventors: Ronald F. Hodge, 2667 Gurley Pike, Gurley, Ala. 35748; George D. Fears, 2571 Hurricane Rd., New Market, Ala. 35761

[21] Appl. No.: 117,454

[22] Filed: Feb. 1, 1980

[51] Int. Cl.³ .......................... A01C 5/00; A01C 7/20
[52] U.S. Cl. ........................................ 111/6; 111/7.1; 111/8; 111/34; 111/DIG. 1
[58] Field of Search .................. 111/6, 7, 7.1, 7.4, 111/8, 34, 73, DIG. 1

[56] References Cited

U.S. PATENT DOCUMENTS

| | | | |
|---|---|---|---|
| 3,189,230 | 6/1965 | Gillespie | 111/73 X |
| 3,714,913 | 2/1973 | Gandrud | 111/73 |
| 3,908,567 | 9/1975 | Brannan | 111/7 |
| 4,034,686 | 7/1977 | Collins | 111/7 |
| 4,145,980 | 3/1979 | Boots | 111/34 X |
| 4,186,671 | 2/1980 | Huang | 111/6 X |

FOREIGN PATENT DOCUMENTS 350459 3/1922 Fed. Rep. of Germany .......... 111/6

*Primary Examiner*—Steven A. Bratlie
*Attorney, Agent, or Firm*—C. A. Phillips

[57] ABSTRACT

A mobile grass seed planter having mounted thereon a frontal line of spaced water nozzles, and behind each nozzle, in a second or back row, is a row of outlets through which seed is directed under air pressure. In operation, as the planter is moved over the earth, a plurality of parallel narrow grooves are cut into the earth by the pressurized water, and the seed is then blown into the grooves. The liquid and airblown seeds are supplied to the planter via hoses from pressurized sources, typically mounted on a truck, tractor, or trailer.

10 Claims, 5 Drawing Figures

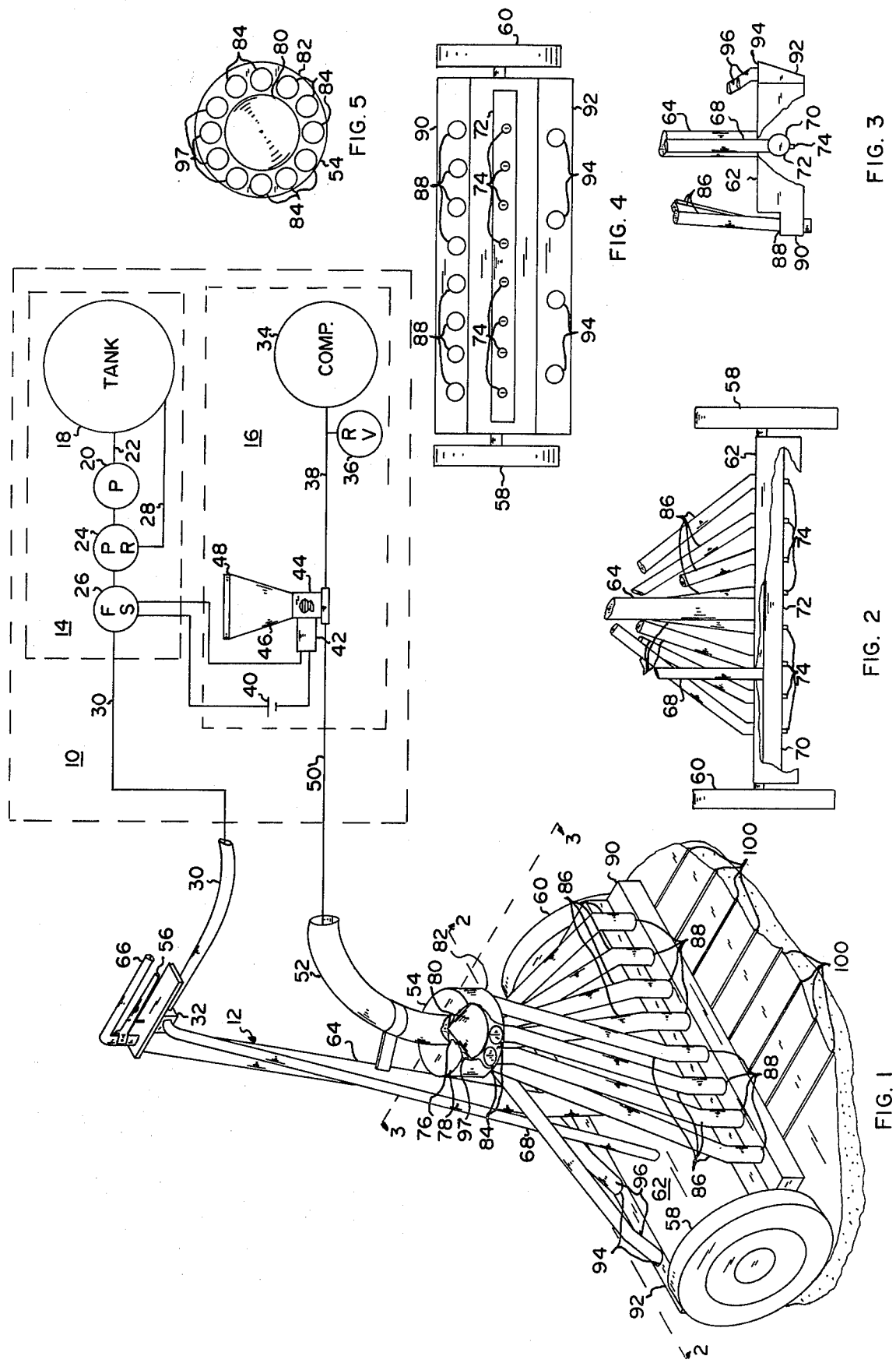

GRASS SEED PLANTER HAVING FLUID INJECTION SOIL OPENER

TECHNICAL FIELD

This invention relates to agricultural planting devices, and to a device particularly capable of planting grass within the soil on flat as well as sloped terrain without disturbing existing vegetation and requiring no prior soil preparation.

BACKGROUND ART

The difficulty of economically planting grass seed and obtaining a good stand of grass is well known. The most economical method is to broadcast the seed over the surface. The disadvantages of this are that the seeds simply wash away, especially if on sloping ground, blow away, or are eaten by birds before they can germinate. In periods of dry weather, the mortality rate of the seeds that do germinate is very high due to their shallow root systems. To obtain better stands using broadcasted seeds, they are raked or disked or otherwise scratched into the soil, mashed down with a roller, and covered with a mulch, such as straw. These procedures increase the cost and require preparation that often cannot be practically performed on steep slopes and can ruin existing vegetation.

Rather standard equipment is available that will plant grass seed under the surface of the soil. However, such equipment requires that the soil be worked up or prepared, thereby ruining existing vegetation. Further, this equipment can only be used on terrain flat and/or large enough to be driven over.

Additionally, special equipment has been developed to plant grass on flat and sloping terrain. This equipment sprays a mixture of seed, water, fertilizer, and a special mulch over the surface of the ground. The mulch tends to harden and hold the seed in place until it can root into the soil. Both the equipment and mixture are quite expensive, and the seeds so planted are still on the surface where they are susceptible to being killed from lack of moisture.

It is the object of this invention to provide a practical and economical method of planting that can be used on flat or sloping terrain or confined areas; will put the seed under the surface of the soil where it will not wash away, blow away, or be eaten by birds; and where more moisture is present longer, does not require prior soil preparation; and does not affect existing vegetation.

STATEMENT OF INVENTION

In accordance with the planter of this invention, seed is randomly distributed in the path of the applicator to be covered by the soil displaced when a groove or grooves are cut into the earth by pressurized liquid, normally water. Immediately, more seed is delivered directly into the groove or grooves from individual seed outlets which are closely positioned behind, with respect to the direction of travel of the applicator, the liquid nozzles. The seeds arrive in the groove while the soil within is wet and somewhat fluid; therefore, they are, because of their arrival velocity, driven into the sides and bottom of the groove and are well protected from being washed or blown away or eaten by birds. When the planted ground is watered or when rained upon, the grooves erode into themselves, effectively covering the seeds and providing an environment conducive to germination and growth.

BRIEF DESCRIPTION OF THE DRAWINGS

FIG. 1 is a combination schematic and pictorial view of an embodiment of the invention.

FIG. 2 is a sectional view along line 2—2 of FIG. 1.

FIG. 3 is a partial side view, which is partially broken away, of FIG. 1.

FIG. 4 is a view of the underside of the embodiment of the invention.

FIG. 5 is a top view of manifold 54 with a top portion removed.

DESCRIPTION OF THE PREFERRED EMBODIMENT

Referring to FIGS. 1 and 2, the present invention is generally divided into two units, a supply unit 10, which typically would be mounted on a truck, tractor, or trailer, and a propelled applicator unit 12. The supply unit is divided into two systems, pressurized liquid supply 14 and pressurized seed supply 16. Pressurized liquid supply 14 consists basically of a water tank 18, typically holding 300 gallons of water, and a pump 20 connected by liquid line 22 to a bottom region of tank 18. Pump 20 provides liquid to pressure regulator 24. Pressure regulator 24 regulates the liquid pressure through flow switch 26, typically from 200 to 1,500 PSI. The unused flow returns to tank 18 through liquid line 28. The flow to be used passes through flow switch 26 to liquid line 30. Line 30 is typically a hose ¼ to ½ inch in diameter, and it connects to a hand-operated valve 32 on applicator unit 12.

Pressurized seed supply 14 includes a compressor 34, protected by relief valve 36, which provides as an output to air line 38 at a typical pressure of 3 to 20 PSI and a typical volume of 40 to 150 cubic feet of free air per minute. When planting, hand-operated valve 32 is opened. The movement of fluid into line 30 is detected by flow switch 26, and a set of contacts are closed. When closed, these contacts provide activating electrical energy from means, such as battery 40, to electric motor 42. Electric motor 42 turns feeder 44 and meters seed from seed hopper 46, which is filled through and made sealable by lid 48, into the air stream from line 38. (It is appreciated that seed metering rates can be accurately varied by using either a variable speed electric motor or a variable displacement feeder.) The seed is rapidly conveyed through line 50 to a flexible hose 52, which is in turn connected to applicator unit 12 where it connects to a flow dividing seed manifold 54. Thus, by operation of handle 56, operated water valve 32, liquid under pressure through line 30, and seed flow are simultaneously controlled.

Applicator 12 is made mobile by a pair of vertically adjustable wheels 58 and 60 which attach to plate 62, which plate 62 is in turn attached to upright bar 64 to handlebar 66 employed to guide the applicator. Liquid or water line 68 connects between valve 32, through plate 62, to a liquid manifold 70 (FIGS. 2 and 3) consisting basically of a length of pipe 72 which extends across and along the top of the underside of plate 62. It has a plurality of nozzles 74 spaced along and fed from pipe 72, each having one or more orifices of a diameter of 0.005 to 0.060 inch to thus provide a very narrow high pressure stream of exiting water from manifold 70. Typically, these orifices would be spaced one inch apart;

and in the illustration shown, there are eight of these orifices.

Seed manifold 54 is generally cylindrical, having a central inlet opening 76 at end 78 connected to and receiving feed from seed feed hose 52. A cone 80 is axially centered within manifold 54 with its apex centered adjacent to opening 76 and its base at opposite end 82. A plurality of exit openings 84 are spaced about the base of the cone at end 82, whereby feed flow diverges evenly to the feed exit openings. Eight tubes 86 connect individually to a like number of exit openings 84 (FIG. 5) of manifold 54 and feed seed to output openings 88 (FIG. 4) in plate 90. Tubes 86 have a typical inner diameter of $\frac{1}{4}$ to $\frac{1}{2}$ inch. Outlet openings 88 in plate 90 are arranged one behind each of nozzles 74, considering the direction of operation of the devices as being along a line perpendicular to the axis of wheels 58 and 60. As an additional feature of this invention, plate 92 (FIGS. 3 and 4) attaches to plate 62 and forms an exhaust manifold for distribution of seed ahead of liquid nozzles 74. Plate 92 has four spaced openings 94 to which four seed tubes 96 connect and supply seed from a like number of exit openings 97 of manifold 54 (FIG. 5).

In operation, with seed in hopper 46, and compressor 34 and pump 20 operating, handle 56 would be operated to turn on water valve 32 and seed feeder 44. Applicator 12 would then be moved along the ground, and the high pressure water from the orifices would cut narrow grooves 100 (FIG. 1), typically $\frac{1}{8}$ to $\frac{1}{4}$ inch in width and $\frac{1}{2}$ to 1 inch in depth, in the ground. Seed distributed through plate 92 would be covered to a degree by the soil disturbed by the following water jets. Additionally, and most significantly, seeds are blown through outlets 88 under sufficient velocity to actually drive them into the somewhat fluid soil inside the grooves. Since the grooves are quite narrow, subsequent watering or rainfall erodes the grooves into themselves, effectively covering the seeds. The seeds are then very well protected from the elements and predators. The planting process is accomplished very rapidly, applicator 12 being movable over the ground at a typical rate of two to four feet per second. While a hand-operated applicator is illustrated, where desired, the applicator can be mounted on a boom connected to a tractor or other vehicle. This is a particularly attractive arrangement where slopes are not steep and where it is desired to effect quite rapid planting over large areas.

Although as illustrated the device is particularly adapted to plant grass seed, it can also be employed for the purpose of planting other like size seed in tilled or untilled soil. The seed sizes would be those no larger than those classed as making up 25,000 seeds per pound. Additionally, due to the relatively low density of plant sprigs, e.g., Bermuda grass, sprigging may also be effected by devices constructed in accordance with this invention.

While as described, the liquid flow is continuous to cut a continuous groove, it is to be appreciated that the liquid could be pulsed on and off to enable spaced plantings and to achieve some reduction in the quantity of water usage.

This invention is significantly less expensive to use than those existing methods necessary to obtain an equivalent stand. In addition, it provides the benefit and savings in energy of being able to plant without soil preparation. This saves existing vegetation and reduces soil erosin.

We claim:

1. A planter comprising:
a frame adapted to be moved by hand over the ground along a selected line of direction;
a source A of pressurized liquid positioned remote from said frame and a flexible conduit coupled to said source A and extending to said frame;
a source B of gas pressurized seed material to be planted, said source B being located remote from said frame, and a second flexible conduit coupled to said source B and extending to said frame;
a plurality of fluid outlets supported by said frame lying generally along a line across said line of direction and coupled to said source A through said flexible conduit, and each being oriented to direct a fine pressurized stream of liquid at a point on the ground, whereby there is cut a plurality of parallel grooves in the ground in said line of direction as said frame is moved along said line of direction;
a like plurality of seed material outlets coupled to said source B through said second flexible conduit, and each supported on said frame along a line which intersects a said fluid outlet wherein said last-named line is along said line of direction, and wherein each said seed material outlet is positioned to direct seed material into one of said grooves as said frame is moved along a said line of direction at a point spaced from the point of impact of a said stream;
valve means coupled in circuit between said source A and, simultaneously, all of said fluid outlets for selectively turning on and off flow simultaneously to said outlets; and
seed control means connected in circuit between said source B and said seed material outlets for initiating and terminating the supply of seed to said seed material outlets;
whereby, by operation of said valve means and said control means, and movement of said frame over ground along said line of direction, a plurality of parallel narrow grooves are simultaneously cut in the ground, and seed is deposited in each groove, and whereby seed is deposited behind and thus spaced from a said stream of liquid, this spacing preventing direct impact by a said stream on deposited seed, reducing the number of seed washing out of a groove, and thereby achieving a higher effective planting rate.

2. A planter as set forth in claim 1 wherein said seed control means includes coupling means for coupling said source B to said second conduit.

3. A planter as set forth in claim 2 wherein said source B comprises:
a source of gas pressure;
a sealable hopper;
said coupling means includes a seed mixing conduit connected between said source of gas pressure and said second conduit; and
said seed control means includes means for selectively coupling or blocking seed flow between said hopper and said mixing conduit.

4. A planter as set forth in claim 2 wherein said valve means includes operating means supported on said frame, and seed control means includes means responsive to the flow of liquid to said fluid outlets for activating said seed control means and initiating flow of seed to said second conduit.

5. A planter as set forth in claim 4 wherein said valve means for turning on and off said flow of said liquid is a hand-operated valve.

6. A planter as set forth in claim 4 including a flow divider mounted on said frame having an inlet coupled to said second conduit and a discrete exit connected to each of said seed material outlets.

7. A planter as set forth in claim 6 wherein said flow divider comprises:
a tubular manifold;
an inlet centrally positioned at one end of said manifold;

the exits of said flow divider are positioned in a circular position around an opposite end of said manifold; and a conical guide having its apex pointed at and centered with respect to the inlet of said flow divider, and the base of the conical guide being concentrically positioned about the inner edges of said exits.

8. A planter as set forth in claim 7 further comprising supplementary material outlet means connected to said frame and coupled to said flow divider for supplying seed to a region of the ground in advance of the cutting of grooves by liquid flow through said fluid outlets, whereby seed would be initially distributed on the ground and then be covered by soil disturbed by the thus following streams of water.

9. A planter as set forth in claim 2 wherein said frame includes wheel means for supporting it on and moving it along the ground.

10. A planter as set forth in claim 2 including a pipe mounted on said frame, said pipe being connected to and fed a pressurized liquid from said flexible conduit and said fluid outlets comprising openings in said pipe.

* * * * *